W. GOLDIE.
Machine for Cutting Shingles.
No. 9,257. Reissued June 15, 1880.
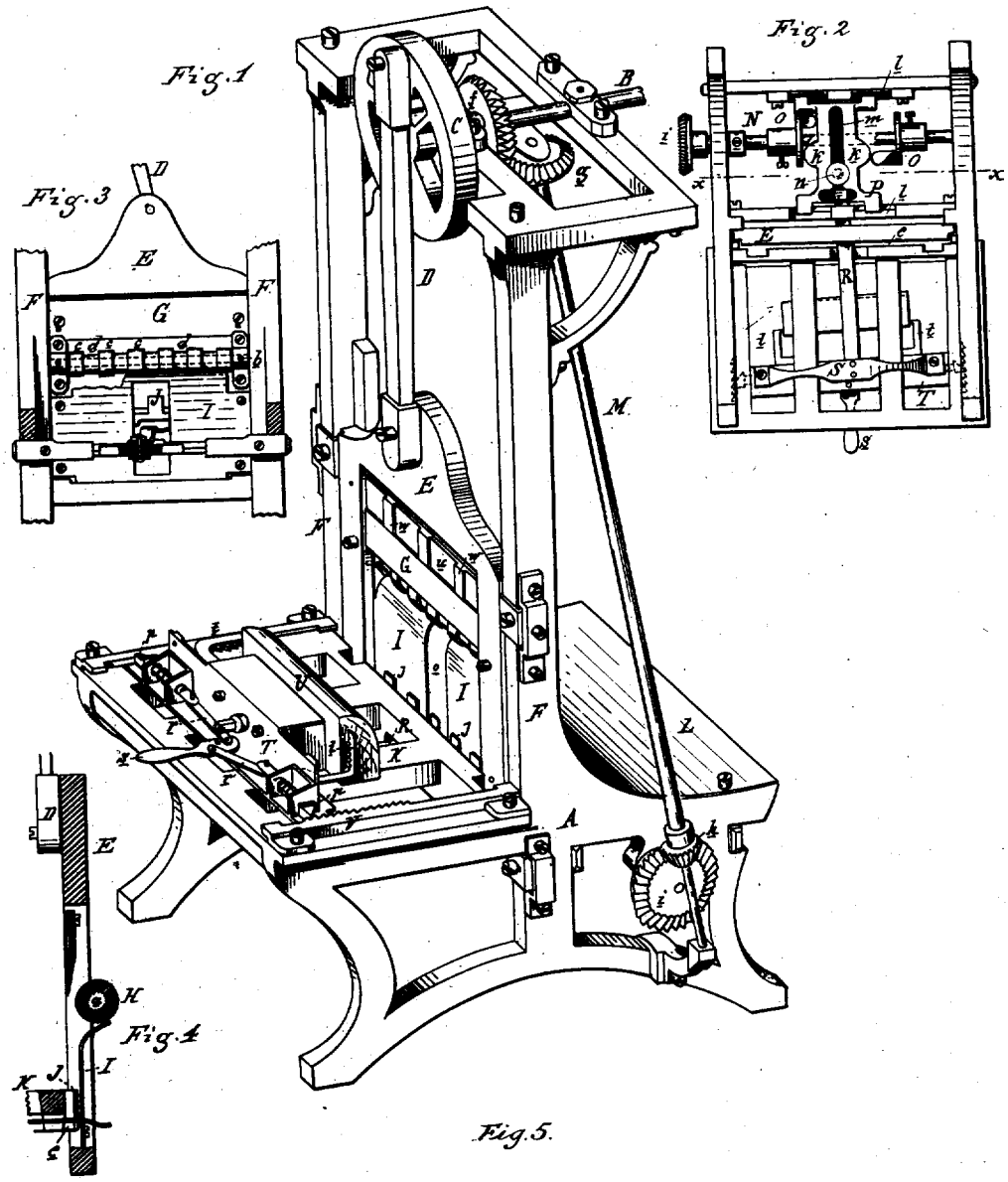
Attest:
A. Barthel
Charles J. Hunt
Inventor:
Wm Goldie
By Atty
Thos S. Sprague
H. PETERS, PHOTO-LITHOGRAPHER, WASHINGTON, D. C.

UNITED STATES PATENT OFFICE.

WILLIAM GOLDIE, OF FENTONVILLE, MICHIGAN.

MACHINE FOR CUTTING SHINGLES.

SPECIFICATION forming part of Reissued Letters Patent No. 9,257, dated June 15, 1880.

Original No. 213,103, dated March 11, 1879. Application for reissue filed November 17, 1879.

*To all whom it may concern:*

Be it known that I, WILLIAM GOLDIE, of Fentonville, in the county of Genesee, in the State of Michigan, have invented an Improvement in Machines for Cutting Shingles, of which the following is a specification.

The nature of my invention relates to new and useful improvements in that class of machines employed in cutting shingles from bolts with knives; and the invention consists in the various combinations and constructions of the operative parts of my improved machine, as fully hereinafter pointed out.

Figure 1 is a perspective view of my improved machine. Fig. 2 is an inverted plan. Fig. 3 is a partial rear elevation. Fig. 4 is a vertical section taken through the knife, the compression-roller, and the guard. Fig. 5 is a detail view of the roller.

In the accompanying drawings, which form a part of this specification, A is a suitable frame to sustain the operating parts of my machine. A driving-shaft, B, is properly journaled in the top of the frame, to which motion is given from any convenient power. Secured to the front end of this shaft is the crank-wheel C, and a pitman, D, communicates motion from this crank-wheel to the cross-head E, which has a reciprocating motion between the cheeks or slides F. Adjustably secured to this cross-head is the cutting-knife G, immediately in the rear of which is the compression-roller H, so arranged that the central axis thereof is in line with the cutting-edge of the knife, and upon a plane just below said edge, as fully shown in sectional Fig. 4. This roller is constructed as follows: A shaft, *a*, is journaled at each end in the boxes *b*, which are secured to the rear side of the cross-head. Upon this shaft are sleeved alternate larger and smaller rings *c d*, the larger of which bear against the rear face of the shingle as the knife passes through the bolt. The rings *c* are smaller at the end of the shaft; those next, *d*, are smaller still, and each of the rings *c* increases in size with each one from the end of the shaft to the center, while the intermediate rings, *d*, are all of the same size and smaller than the smallest of the rings *c*, which have bevel-faces from the center outward, as shown in Figs. 3 and 5.

The reasons for this construction of roller are, first, the bearing-surface is so much diminished by the intervening collar-rings, *d*, that, without diminishing the utility of the compression, much less power is required than if a full-faced roller were employed; secondly, the intervening collar-rings allow fingers to be employed to throw out the shingles when cut, which could not be done with a full-faced roller; and, thirdly, the faces of the rings *c* are beveled from the center of the shaft outwardly, because the distance between them and the rear side of the knife is required to be greater at the outer ends of the roller than at the center, because alternately the butts and tips, or the thicker and thinner ends, of the shingles are presented, while the thickness presented at the center is more uniform.

A very fair shingle may be made with a solid roller, or even with a compression-bar; but the roller above described is far preferable for rapid and perfect work. The position as well as construction of this roller has much to do with such rapid and perfect work.

It will be noticed that the central axis of the roller is in rear of and upon a plane below the cutting-edge of the knife. In cutting shingles from the side of a bolt the checking commences just in advance of the knife, and the position of the roller must be such as to prevent this, as shown in Fig. 4. It will be noticed in this figure that in the downward stroke of the knife the compression exerted by this roller commences in advance of the knife upon the plane of the axial center of the roller, and the bevel of the knife in its advance compels an equal compression some little distance above the cutting-edge, and until all danger of checking or splitting the shingle is avoided.

I is a rigid shield secured to the lower part of the cross-head, and its upper end curves to the rear, immediately under the compression-roller, as shown in Fig. 1. This shield prevents the bolt, if accidentally undogged, from passing under the roller and breaking the machine.

Fingers J are attached to the rear end of the table K, of a uniform height, and in the downward stroke of the cross-head they enter the intervening spaces in the compression-roller formed by the collar-rings *d*, between the roller-rings *c*, and force the shingles, when cut, upward, so that they fall rearward over the top of the roller onto the apron L, which covers the rear part of the machine. A narrow space exists between these fingers and the table, which space gradually increases in width until it terminates in a throat, *e*, (shown in Fig. 2,) through which débris will fall to the floor. If this were not provided the débris collecting at this point would soon dull the knife. Care should be had in placing the fingers to give room at their upper ends for the knife to pass between these ends and the rear of the table.

A shaft, M, communicates motion from the driving-shaft B to the feed mechanism by means of the bevel-wheel *f* on said shaft engaging with a similar wheel, *g*, on the shaft M, and a bevel-pinion, *h*, engaging with a bevel-wheel, *i*, on the shaft N, which operates such feed-works. Upon this shaft are rigidly secured the cams O, set at opposite ends of shaft N, with their working faces arranged at opposite sides of the shaft, so that one and the other are alternately brought into action with each successive half-revolution of the shaft. These cams alternately engage with the rigid wings *k*, projecting, one on each side, from the slide P, which has a lateral reciprocating motion on the guides *l*, which are rigidly secured to the frame A beneath the apron L. This slide is provided with a T-shaped slot, *m*, through which the bolt *n* passes. Pivoted to this bolt is the connecting-rod R, which passes forward through the long vertical slot *o* in the shield I, and its forward end is rigidly secured to the yoke S, the ends of which are secured to the feed-bar T or head-block, the parts being so arranged and connected that the alternating lateral reciprocation of the slide P will vibrate the rod R and yoke S, causing the pawls *p* to take alternately in the teeth of racks V. Thus the movement of slide P will cause the ends of the head-block alternately to advance, thereby forcing the bolt U to present itself to the knife, so that each shingle cut therefrom will be the reverse of the preceding one—that is to say, technically speaking, butts and tips will alternately be presented.

Racks V are secured one to each side of the table K. To the head-block are secured the spring-pawls *p*, operating to prevent rearward slippage to either end of said head-block as it is advanced, as before described. A combination of levers, *r r'*, actuated by the lever *s*, enables these pawls to be disengaged when necessary to withdraw the head-block to the front end of the machine to replace a bolt. Dogs *t*, of any desired construction, are employed to secure the bolt to the feed-bar or head-block.

In order not to be compelled to stop the machine when dogging a fresh bolt, the head-block is withdrawn until the bolt *n* enters the slot of the cross-head *m*, when the slide P may reciprocate without communicating motion to the head-block. After the bolt is dogged the head-block is advanced toward the rear end of the table until the bolt *n* enters the longitudinal part of the slot, when the motion of the slide will again actuate the head-block, as described.

It will be noticed that the upper half of the front face of the cutting-knife is cut away or recessed, as at *u*, and secured within this recess are narrow vertical bearers *w*. The object of this is twofold—first, to present less frictional surface than if the whole face of the knife were solid; and, secondly, to allow air to intervene between this part of the knife-front and the bolt, to prevent the latter from sticking to the knife, as would be the case were it not for this construction. If preferred, the face of the knife may be channeled from its upper edge part way down, which would accomplish the same end.

What I claim as my invention is—

1. In a shingle-cutting machine adapted to cut the tips and butts of shingles from the opposite ends of the block alternately, in combination with a knife, a compression-roller tapering from the center to each end and arranged in the rear of the knife, substantially as and for the purposes described and shown.

2. In a shingle-cutting machine, and in combination with a vertically-reciprocating cross-head, the cutting-blade or knife recessed upon its outer face and in the upper half thereof, and provided with bearers, substantially as and for the purpose specified.

3. In a shingle-cutting machine, the compression-roller, consisting of a shaft upon which are alternately sleeved larger and smaller rings, said rings being loose upon said shaft and made gradually smaller from the center to the ends, constructed and operating substantially as herein set forth.

4. In a shingle-cutting machine, and in combination with a vertically-reciprocating knife, and with a compression-roller constructed as described, a series of fingers arranged and operating to force the shingles upward, substantially as described.

5. In a wood-cutting machine having a knife and compression-roller arranged as described, whereby the center of the roller is fixed below the edge of the knife, in combination therewith, an automatic locking intermittent feeding device, substantially as described.

6. In a wood-cutting machine with an intermittent feed and adapted to alternately cut the tip and butt of a shingle from a bolt, and in combination therewith, a knife and a compressing-roller, constructed and arranged to compress the thick portion of a shingle only, substantially as described.

7. In a shingle-cutting machine, the laterally-reciprocating slide P, provided with T-shaped slot *n*, and actuated by cams O upon the shaft N, giving motion through a suitable connection to the head-block and its retaining devices, and discontinuing such motion when the head-block has been drawn back, substantially as described.

8. In a shingle-cutting machine, a cross-head, E, having a vertically-reciprocating motion, and carrying a cutting-knife and a compression roller or bar, in combination with a shield, I, substantially as specified.

9. In a wood-cutting machine, and in combination with the knife thereof, a roller constructed and arranged to compress the portion cut from the block, consisting of a shaft having a series of large rings of hard inelastic material constructed and arranged to revolve loosely on said shaft, alternating with smaller rings, substantially as and for the purpose specified.

10. In a shingle-machine, the combination of a head-block or feed-bar, T, spring-pawls *p p*, racks V V, and yoke S with the rod R, constructed and arranged to receive, by a suitable connection, motion from the cams O on the shaft N, substantially as described.

11. In a shingle-machine constructed substantially as described, and in combination with a vertical reciprocating knife, a series of fingers arranged substantially parallel with the bed, so as to leave between the bed and fingers the throat for the discharge of débris, as specified.

WM. GOLDIE.

Witnesses:
H. S. SPRAGUE,
CHARLES J. HUNT.